May 22, 1956  B. BARÉNYI  2,746,099

MOTOR VEHICLE EQUIPPED WITH A DEFROSTING SYSTEM

Filed Feb. 20, 1952

Inventor
Béla Barényi
By Hicke & Padlon
Attorneys

United States Patent Office 2,746,099  
Patented May 22, 1956

2,746,099

MOTOR VEHICLE EQUIPPED WITH A DEFROSTING SYSTEM

Béla Barényi, Stuttgart-Rohr, Germany, assignor to Daimler-Benz Aktiengesellschaft, Stuttgart-Unterturkheim, Germany Application February 20, 1952, Serial No. 272,679

Claims priority, application Germany February 22, 1951

8 Claims. (Cl. 20—40.5)

The present invention relates to a motor vehicle, particularly for passenger service, being equipped with a defrosting system. With motor vehicles of this kind only the front window is defrosted. According to the present invention there is also connected the rear window and, if desired, the side windows with the defrosting system. This can practically be brought about by a defrosting system consisting of box-like cavities provided with nozzles, the cavities being disposed below the windows and jointly fed with heated air. Thereby the walls of the cavities can be insulated against heat waste either entirely or in part.

Owing to the present invention the free sight of the driver and the passengers is not limited to the front window in cold weather.

According to the present invention the construction of the motor vehicle may be expediently simplified by using hot-air boxes of the same construction for both the front window and the rear window, as well as uniform panes for these windows. The hot-air boxes may be thereby appropriately connected with the hood of the vehicle and may also be detachably fastened along the bottom part thereof. The hot-air boxes thereby serve simultaneously as transverse braces for the hood.

The installation of the hot-air boxes, if necessary with the hood, may be facilitated by the use of appropriate fasteners, for example, fasteners of the snap button type, which would bring about automatic fastening during the installation of the hot-air boxes.

However, the hot-air boxes may also be fastened to the center cell of the vehicle by simultaneously constructing the junction or connection of the air pipes as a fastening device.

The accompanying drawing illustrates schematically two embodiments of the present invention.

Figure 1:
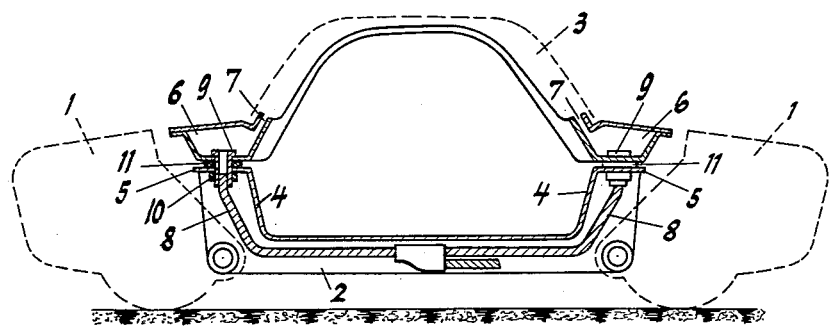
Figure 2:
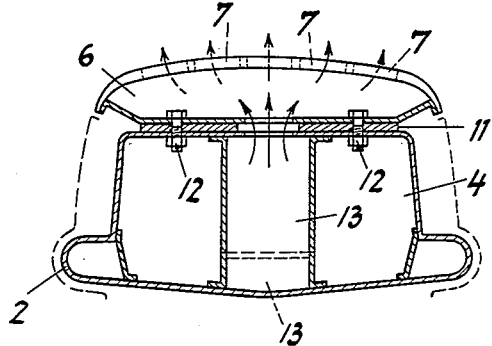

Figure 1 shows a first embodiment of a motor vehicle according to the present invention in a longitudinal section, and Figure 2 shows another embodiment of a motor vehicle in accordance with the present invention in cross section.

Referring now to the drawing, wherein like reference numerals are used throughout the various views to designate like parts, reference numeral 1 designates two end cells connected with a hinge-mounted middle or center cell, the motor vehicle being composed of three cells. The end cells 1 may be resiliently supported against the middle or center cell. The middle or center cell consists of a bottom part 2 and a hood 3 enclosing the center cell. The center cell may be appropriately formed symmetrically with respect to the transverse center plane of the vehicle. The bottom part 2 comprises two walls 4 which form horizontal bearing surfaces 5 at their top ends. A hollow box-like compartment forming cavity 6 is mounted on each of the bearing surfaces 5. As shown in Figure 1, the cavities are disposed below the hood 3 and are provided with nozzle-like orifices 7 along the edge nearest the adjacent window pane so as to be directed toward the front window or the rear window.

The hollow box-like compartment extends over the entire width of the vehicle and also extends a substantial amount in the longitudinal direction of the vehicle toward the adjacent vehicle end, whereby the upper wall delimiting the box-like compartment simultaneously serves for purposes of defrosting the snow or ice accumulated thereon when hot air is conducted into the cavity 6.

In the case of the embodiment illustrated in Figure 1 both the boxes 6 are connected with the engine of the motor vehicle by means of a hose pipe or pipe line 8 so that they can uniformly be fed with hot air. This pipe line 8 is connected with the box 6 by means of a flanged pipe socket 9 which extends downward through an opening in the bearing surface 5. At the projecting end of the flanged pipe socket 9 there is mounted a coupling member 10 with the pipe line 8 so that the box 6 is tightly connected with the bearing surface 5. Between the box 6 and the bearing surface a resilient intermediate shim 11 can be provided for.

In the construction of the embodiment as illustrated in Figure 2 the box 6 is connected with the bearing surface 5 by means of bolts and nuts 12; the hot air is admitted through a canal 13.

What I claim is:

1. In a passenger car having a closable central passenger compartment with adjoining front and rear hoods, one of said hoods covering the driving engine and the other of said hoods covering a trunk compartment, a defrosting system including nozzles for defrosting at least a front window and a rear window by means of warm air emerging from the nozzles of the defrosting system, the defrosting system of each of said windows comprising a box-like hollow compartment with an upper delimiting wall simultaneously constituting the outer body wall thereat, said box-like hollow compartment containing said nozzle and extending directly from below the window to be defrosted a short distance in the longitudinal direction of the vehicle toward the adjacent end thereof and extending in the transverse direction of the vehicle over the entire width of the adjoining hood, whereby said box-like compartment forms a brace for said adjoining hood and whereby the snow and ice accumulated on said upper wall is also defrosted.

2. In a passenger car with a defrosting system according to claim 1 wherein the box-like compartments constituting hot-air boxes are formed by parts independently of the existing vehicle chassis.

3. In a passenger car with a defrosting system according to claim 1 wherein said box-like hollow compartments form constituent parts of hot-air boxes, further comprising means for rigidly connecting each hot-air box with the neighboring hood, and means for removably fastening each hot-air box including said neighboring hood to the chassis of the vehicle.

4. In a passenger motor vehicle with a defrosting system according to claim 1 wherein said box-like compartments form hot-air boxes and are of substantially identical construction for both the front and rear windows of the vehicle.

5. In a passenger vehicle having a central passenger section and articulated front and rear sections of corresponding configuration, a defrosting system for the windows of said central section comprising a hot-air conduit for conducting air to be heated by the vehicle engine, at least one hot-air compartment for each of the front and rear windows of said passenger section, said compartments being located below the hood and extending transversely over the entire width of the vehicle and extending in the longitudinal direction a predetermined substantial distance toward the adjacent vehicle end, and resilient coupling means for interconnecting said conduit and said compartment without interfering with the articulation of the respective sections of the vehicle.

6. In a passenger motor vehicle a defrosting system according to claim 5, wherein the resilient coupling means simultaneously constitutes a means for fastening said conduit to said compartment and a means for fastening said compartment to the vehicle chassis.

7. In a passenger motor vehicle with three cells of which the two end cells are articulately connected with the center cell, and having at least a front window and a rear window in said center cell, each end cell including a hood-like member, a defrosting system for each of said windows comprising means forming a hollow box-like compartment for bracing an adjoining hood-like member, said box-like compartment being disposed below and contiguous to an adjacent window and including nozzles directed against such adjacent window, said box-like compartment extending over the entire width of the vehicle in a transverse direction thereof and extending a predetermined distance in the longitudinal direction of the vehicle towards an adjacent end thereof, said box-like compartment being delimited directly in the upper part thereof by the outer body wall, and means for resiliently mounting said first-mentioned means on said center cell.

8. In a passenger motor vehicle a defrosting system according to claim 7 further comprising means for conducting hot air to said compartment, and wherein said second-mentioned means simultaneously constitutes a means for connecting said third-mentioned means with said compartment and for connecting said first-mentioned means with said center cell.

References Cited in the file of this patent

UNITED STATES PATENTS

| | | |
|---|---|---|
| 1,861,333 | Zuhlke et al. | May 31, 1932 |
| 2,045,826 | Benolken | June 30, 1936 |
| 2,133,488 | Stearns | Oct. 18, 1938 |
| 2,150,110 | Strauss et al. | Mar. 7, 1939 |
| 2,176,143 | Miller | Oct. 17, 1939 |
| 2,492,506 | Stinnett | Dec. 27, 1949 |